(12) United States Patent
Shanmugam

(10) Patent No.: US 10,862,971 B2
(45) Date of Patent: *Dec. 8, 2020

(54) INTERNET OF THINGS GATEWAY SERVICE FOR A CLOUD FOUNDRY PLATFORM

(71) Applicant: EMC IP Holding Company LLC, Hopkinton, MA (US)

(72) Inventor: Karunanithi Shanmugam, Frisco, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/965,022

(22) Filed: Apr. 27, 2018

(65) Prior Publication Data

US 2019/0334995 A1    Oct. 31, 2019

(51) Int. Cl.
*G06F 15/16*    (2006.01)
*H04L 29/08*    (2006.01)
(Continued)

(52) U.S. Cl.
CPC .............. *H04L 67/12* (2013.01); *H04L 69/08* (2013.01); *H04L 69/18* (2013.01); *H04W 4/12* (2013.01); *H04W 4/38* (2018.02)

(58) Field of Classification Search
CPC ......... H04L 67/12; H04L 69/08; H04L 69/18; H04W 4/38; H04W 4/12; G06F 8/77; G06F 9/44

(Continued)

(56) References Cited

U.S. PATENT DOCUMENTS 8,428,514 B2   4/2013  Wu et al.
10,082,562 B1  9/2018  Kbari et al.
(Continued)

OTHER PUBLICATIONS

Edmonds, Kevin Owen. "IoT Meets HPC: Securely Transferring Wireless Sensor Data to a Supercomputer Utilizing the LRZ Cloud." MNM Team Homepage, 2017, www.mnm-team.org/pub/Fopras/ednno17/PDF-Version/edmo17.pdf. (Year: 2017).*

(Continued)

*Primary Examiner* — Kaylee J Huang
(74) *Attorney, Agent, or Firm* — Ryan, Mason & Lewis, LLP

(57) ABSTRACT

An Internet of Things (IoT) gateway service is provided on a cloud-based platform, such as a cloud foundry platform. An exemplary method comprises: providing an IoT gateway service in a cloud-based platform, wherein the IoT gateway service comprises a message broker; obtaining, by the IoT gateway service, a wireless communication from one or more sensor devices; converting the wireless communication to a message in a machine-to-machine IoT connectivity protocol; and providing the message to the message broker that determines a topic of the message and publishes the message to one or more client devices that have subscribed to the topic. A service broker may be created that wraps the IoT gateway service as a tile in the cloud-based platform. A configurable and vendor neutral open source implementation of the IoT gateway service is also provided.

20 Claims, 6 Drawing Sheets

(51) Int. Cl.
*H04W 4/12* (2009.01)
*H04L 29/06* (2006.01)
*H04W 4/38* (2018.01)

(58) Field of Classification Search
USPC .......................................... 709/206, 230, 204
See application file for complete search history.

(56) References Cited

U.S. PATENT DOCUMENTS

| | | | |
|---|---|---|---|
| 10,425,194 B2 | 9/2019 | Wang et al. | |
| 10,440,096 B2 | 10/2019 | Sabella et al. | |
| 10,715,640 B2 | 7/2020 | Bikumala et al. | |
| 2005/0278410 A1* | 12/2005 | Espino | H04L 67/2823 709/201 |
| 2008/0141280 A1* | 6/2008 | Azulai | G06F 9/541 719/317 |
| 2015/0016359 A1 | 1/2015 | Wang et al. | |
| 2015/0288636 A1 | 10/2015 | Yalavarty et al. | |
| 2016/0004575 A1* | 1/2016 | Fink | G06F 9/541 719/328 |
| 2016/0019294 A1 | 1/2016 | Dong et al. | |
| 2016/0329965 A1 | 11/2016 | Cook et al. | |
| 2016/0337206 A1 | 11/2016 | Bugenhagen et al. | |
| 2016/0344841 A1 | 11/2016 | Wang et al. | |
| 2017/0180289 A1* | 6/2017 | Chiappone | H04L 67/22 |
| 2017/0180380 A1 | 6/2017 | Bagasra | |
| 2017/0310767 A1 | 10/2017 | Flynn, IV et al. | |
| 2017/0359443 A1 | 12/2017 | Wei et al. | |
| 2017/0364046 A1* | 12/2017 | Westrick, Jr. | G05B 15/02 |
| 2018/0011694 A1 | 1/2018 | Al-Fuqaha et al. | |
| 2018/0040172 A1 | 2/2018 | Funk | |
| 2018/0054799 A1 | 2/2018 | Starsinic et al. | |
| 2018/0063250 A1 | 3/2018 | Justin et al. | |
| 2018/0143825 A1* | 5/2018 | Noens | G06F 8/77 |
| 2018/0146041 A1 | 5/2018 | Moustafa et al. | |
| 2018/0159815 A1 | 6/2018 | Halley et al. | |
| 2018/0165978 A1* | 6/2018 | Wood | G05B 19/0423 |
| 2018/0181095 A1 | 6/2018 | Funk | |
| 2018/0262597 A1* | 9/2018 | Matthieu | H04L 69/18 |
| 2018/0285580 A1 | 10/2018 | Chen et al. | |
| 2018/0302751 A1 | 10/2018 | Coutinho | |
| 2018/0309831 A1* | 10/2018 | Sherman | H04L 67/125 |
| 2018/0316555 A1 | 11/2018 | Salgueiro et al. | |
| 2018/0351808 A1 | 12/2018 | Das | |
| 2018/0359530 A1* | 12/2018 | Marlow | G11B 27/02 |
| 2019/0007513 A1 | 1/2019 | Flynn, IV et al. | |
| 2019/0061771 A1 | 2/2019 | Bier et al. | |
| 2019/0104458 A1 | 4/2019 | Svennebring et al. | |
| 2019/0132276 A1* | 5/2019 | Scheiber | H04L 51/36 |
| 2019/0137622 A1 | 5/2019 | Lopez-Hinojosa et al. | |
| 2019/0150074 A1 | 5/2019 | Narayanan et al. | |
| 2019/0166223 A1 | 5/2019 | Zhu | |
| 2019/0182895 A1 | 6/2019 | Di Girolamo et al. | |
| 2019/0197497 A1 | 6/2019 | Abari et al. | |
| 2019/0209022 A1 | 7/2019 | Sobol et al. | |
| 2019/0222652 A1 | 7/2019 | Graefe et al. | |
| 2019/0250622 A1 | 8/2019 | Mister et al. | |
| 2019/0319868 A1 | 10/2019 | Svennebring et al. | |
| 2019/0324450 A1 | 10/2019 | Lurie et al. | |
| 2019/0349848 A1 | 11/2019 | Bali | |
| 2020/0014762 A1 | 1/2020 | Li et al. | |

OTHER PUBLICATIONS

Zarko, Ivana Podnar, et al. "IoT Data Management Methods and Optimisation Algorithms for Mobile Publish/Subscribe Services in Cloud Environments." 2014 European Conference on Networks and Communications (EuCNC), 2014, doi:10.1109/eucnc.2014. 6882657. (Year: 2014).*
https://github.com/eclipse/mosquitto.rsmb, downloaded on May 17, 2018.

* cited by examiner

US 10,862,971 B2

INTERNET OF THINGS GATEWAY SERVICE FOR A CLOUD FOUNDRY PLATFORM

FIELD

The field relates generally to information processing systems.

BACKGROUND

The Internet of Things (IoT) is a network of distributed physical devices, such as vehicles and sensors, that exchange data over the network. With the proliferation of IoT, sensor data comprises information regarding a number of diverse physical variables. Such information is useful for a wide range of applications, such as surveillance and other law enforcement applications, medical monitoring, transportation monitoring, habitat monitoring, factory control, and pipeline integrity.

The IoT has been described, however, as vertical silos of proprietary systems, with little, if any, interoperability among similar IoT systems. A need exists for an IoT gateway service that improves interoperability among IoT systems and devices using established communication standards and protocols.

SUMMARY

Illustrative embodiments of the present disclosure provide an IoT gateway service on a cloud-based platform, such as a cloud foundry platform. In one embodiment, an exemplary method comprises: providing an IoT gateway service in a cloud-based platform, wherein the IoT gateway service comprises a message broker; obtaining, by the IoT gateway service, a wireless communication from one or more sensor devices; converting the wireless communication to a message in a machine-to-machine IoT connectivity protocol; and providing the message to the message broker that determines a topic of the message and publishes the message to one or more client devices that have subscribed to the topic. In one or more embodiments, a service broker is created that wraps the IoT gateway service as a tile in the cloud-based platform.

In some embodiments, the wireless communication comprises sensor data transmitted using a Bluetooth standard and the machine-to-machine IoT connectivity protocol comprises a Message Queuing Telemetry Transport protocol (communicated within the IoT gateway service, for example, using a User Datagram Protocol and/or a Transmission Control Protocol).

In at least one embodiment, the message broker is implemented using open source technology, such that the message broker can publish messages to client devices in a vendor neutral format. The message broker and client devices optionally employ a substantially same open source technology.

Other illustrative embodiments include, without limitation, apparatus, systems, methods and computer program products comprising processor-readable storage media.

DETAILED DESCRIPTION

Figure 1:
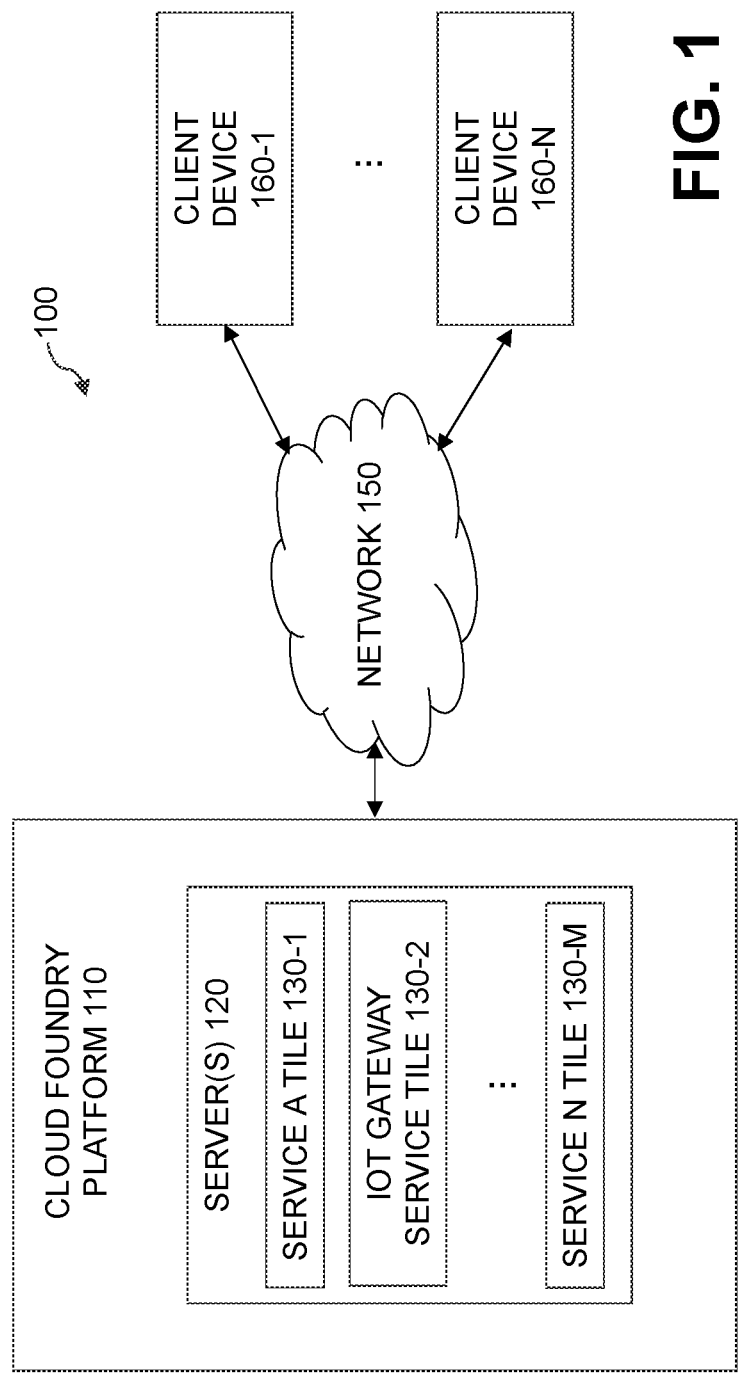
FIG. 1 illustrates an information processing system configured in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. Accordingly, the term "sensor" as used herein is intended to be broadly construed, so as to encompass, for example, sensors designed specifically for a specific purpose, such as thermometers, cameras and smoke detectors, as well as general-purpose devices, such as smartphones and tablets that perform a sensing function.

One or more embodiments of the disclosure provide methods, apparatus and computer program products for providing an IoT gateway service on a cloud-based platform, such as the cloud foundry platform.

In some embodiments, an IoT gateway service is provided for a cloud-based platform, such as a Pivotal Cloud Foundry (PCF) platform from Pivotal Software, Inc. The IoT gateway service obtains a wireless communication, transmitted, for example, using a Bluetooth standard, from sensor devices, converts the wireless communication to a machine-to-machine IoT connectivity protocol, such as a Message Queuing Telemetry Transport (MQTT) protocol; and provides the converted wireless communication as a message to a message broker that determines a topic of the message. The message broker optionally verifies the topic of the message and publishes the message to one or more client devices that have subscribed to the topic.

In one or more embodiments, one or more components of the disclosed IoT gateway service are implemented using one or more open source technologies that allow the components to be configurable and/or vendor neutral.

In at least one embodiment, the disclosed IoT gateway service can be wrapped with a service broker in the cloud foundry. The wrapped IoT gateway service can be created in some embodiments as a tile, as discussed further below in conjunction with FIG. 1. Thus, in some embodiments, a service broker comprises the disclosed IoT gateway service. Generally, services can be integrated with a cloud foundry, such as PCF, by implementing a documented Application Programming Interface (API) for which a cloud controller is the client; referred to in PCF as the service broker API. "Service broker" refers to a component of the service that implements the service broker API. Service brokers advertise a catalog of service offerings and service plans, as well as interpreting calls for provision (create), bind, unbind, and deprovision (delete), in a known manner.

Service brokers allow developers to create service instances in their development spaces that the developers can call from their code. The service brokers provide an interface between a cloud controller and the add-on software service that they represent. The service can run internal or external to a cloud foundry deployment, but the service broker runs inside the cloud.

The service broker works by providing an API which the cloud controller calls to create service instances, bind them to applications, and perform other operations. Cloud foundry service brokers are implemented as HTTP servers that conform to the service broker API.

While one or more embodiments of the disclosure are described with respect to a cloud foundry platform, the disclosure is applicable to any cloud-based platform, such as the PCF platform, as would be apparent to a person of ordinary skill in the art.

FIG. 1 illustrates an information processing system 100 configured in accordance with an illustrative embodiment. The information processing system 100 is assumed to be built on at least one processing platform and provides functionality for providing an IoT gateway service on a cloud-based platform, such as the cloud foundry platform. In the embodiment of FIG. 1, the system 100 more particularly comprises a cloud foundry platform 110, and a plurality of client devices 160-1 through 160-N (collectively, client devices 160) coupled to a network 150.

The cloud foundry platform 110 may be implemented on a single server, or alternatively, on multiple servers, that may be physical, virtual, or a combination thereof. In one embodiment of the disclosure, the cloud foundry platform 110 may be implemented on one or more computing systems similar to the exemplary computing systems shown in FIGS. 5 and 6.

In one embodiment of the disclosure, the cloud foundry platform 110 may be a hardware and/or software implemented environment for the deployment of services and resources. The cloud foundry platform 110 may be implemented on one or more servers 120. Each server 120 may be a physical server or a virtual server that may be cloud-based. In some embodiments, each server 120 may be a computing system similar to the exemplary computing systems discussed further below in conjunction with FIGS. 5 and 6. Further, each server 120 may be any computing system that may be programmed to receive requests, process requests, and based on the processing of requests, extend services and/or resources to client devices 160. Exemplary types of servers include, but are not limited to, virtualized servers, database servers and application servers.

As shown in FIG. 1, the one or more servers 120 of the cloud foundry platform 110 comprise a plurality of service tiles 130-1 through 130-M, including an exemplary IoT gateway service tile 130-2 according to some embodiments. Generally, a cloud foundry platform 110 offers a directory of services, from which users can provision reserved resources, in a known manner. These resources are known as service instances and the systems that deliver and operate these resources are known as Services.

Services optionally integrate with a cloud foundry, such as PCF, through tiles that users download from the Pivotal Network and install using the PCF Ops Manager Installation Dashboard. Generally, tiles provide a modular, standard interface that PCF operators use to configure, publish, manage and upgrade software services, in a known manner. For example, a service broker can wrap the disclosed IoT gateway service as the IoT gateway service tile 130-2 in the cloud foundry platform 110, as discussed further below in conjunction with FIG. 3.

For a more detailed discussion of tile development and tile deployment in a cloud foundry, see, for example, Pivotal Documentation, PCF Tile Developers Guide, Version 1.12, "Service Integration Overview," incorporated by reference herein in its entirety.

The exemplary IoT gateway service tile 130-2 exposes an IoT gateway service, as discussed further below in conjunction with FIG. 2. Among other benefits, the IoT gateway service exposed by the exemplary workflow service tile 130-2 improves interoperability among IoT systems and devices using established communication standards and protocols, as discussed below.

The client devices 160 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 160 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The network 150 is assumed to comprise a global computer network such as the Internet, although other types of networks can be part of the network 150, including a wide area network (WAN), a local area network (LAN), a satellite network, a telephone or cable network, a cellular network, a wireless network such as a WiFi or WiMAX network, or various portions or combinations of these and other types of networks.

While aspects of the illustrative embodiments are described using PCF, other types of cloud foundries can be employed, such as open source cloud foundries and the Dell Boomi™ integration cloud provider from Dell EMC of Hopkinton, Mass.

Figure 2:
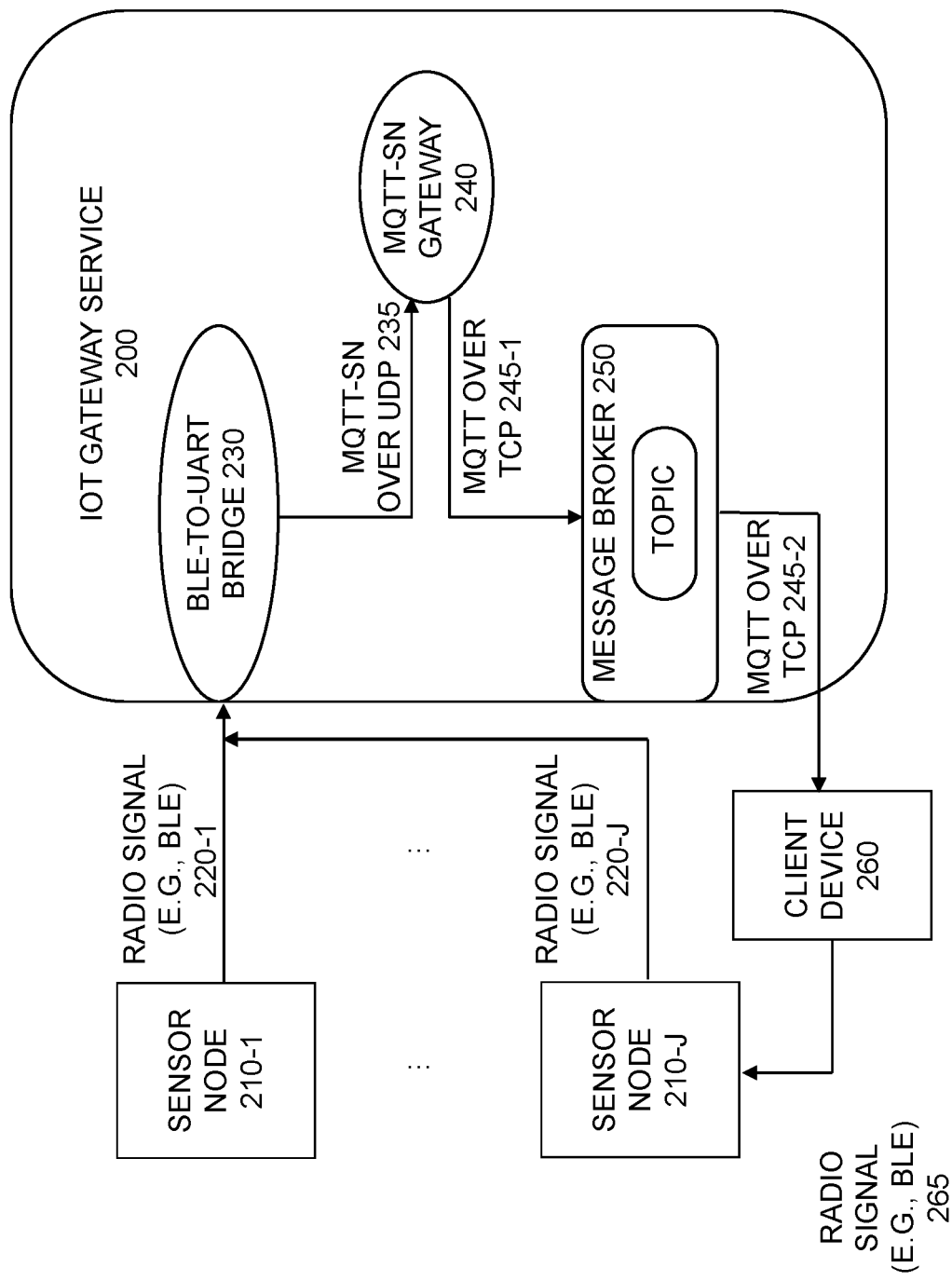
FIGS. 2 and 3 illustrate an exemplary IoT gateway service, according to some embodiments.

FIG. 2 illustrates an exemplary IoT gateway service 200, according to some embodiments. As noted above, the exemplary IoT gateway service 200 can optionally be exposed by the exemplary IoT gateway service tile 130-2 of FIG. 1. The exemplary IoT gateway service 200 receives radio signals 220-1 through 220-J (collectively, radio signals 220), such as a Bluetooth Low Energy (BLE) protocol, from one or more sensor nodes 210-1 through 210-J.

As shown in FIG. 2, the radio signals 220 are processed in the exemplary IoT gateway service 200 by a BLE-to-UART (Universal Asynchronous Receiver-Transmitter) bridge 230 that converts the radio signals 220 into an MQTT format, such as MQTT-SN (sensor network) messages over UDP (User Datagram Protocol) 235. The MQTT-SN over UDP messages 235 are processed by an MQTT-SN gateway 240 that converts the MQTT-SN over UDP messages 235 to MQTT-SN over TCP (Transmission Control Protocol) messages 245-1 and provides the MQTT-SN over TCP messages 245-1 to a message broker 250.

In some embodiments, the message broker 250 is implemented as an MQTT message broker, such as a Really Small Message Broker (RSMB). The message broker 250 determines a topic of a given message 245-1 and publishes the given message 245-1 to one or more client devices 260 that have subscribed to the particular topic as MQTT-SN over TCP messages 245-2. The exemplary message broker 250 optionally also provides authorization and/or access control for the message, for example, using an authorization mechanism such as Lightweight Directory Access Protocol (LDAP)/AD (Active Directory).

The message broker 250 optionally stores the messages according to various topics and the topics can be subscribed by different client devices 260.

The exemplary client device 260 can optionally provide a radio signal 265, for example, in a BLE format to one or more of the sensor nodes 210-1 through 210-J. The radio signal 265 may be based, for example, on the topic of the message. In this manner, the reactive stream of data/signal can be sent by the exemplary client device 260 that can be sent back to the sensor nodes 210 by the client devices 260 (listeners of these topics) which, in turn, can be converted as BLE radio signals 265 and sent to the sensor node 210 of the IoT devices.

In at least one embodiment, the client device(s) 260 are implemented as message listener processes that act as a subscriber to various topics of interest provided by the message broker 250. Thus, the client device(s) 260 subscribes to the specified topics. When a message 245-1 has been sent by the MQTT-SN gateway 240, the message broker 250 receives the message 245-1 and optionally decides if the topic of the message 245-1 is valid. Once the topic has been verified, if needed, the message broker 250 publishes the message to the respective topic, for example, in an event source (not shown) or directly to the client device(s) 260. In some embodiments, the message broker 250 and client device(s) 260 are implemented using open source technology, and optionally employ the same open source technology, such as a RabbitMQ open source message broker. In this manner, the message broker 250 can publish the message to the client devices 260 in a vendor neutral format.

Figure 3:
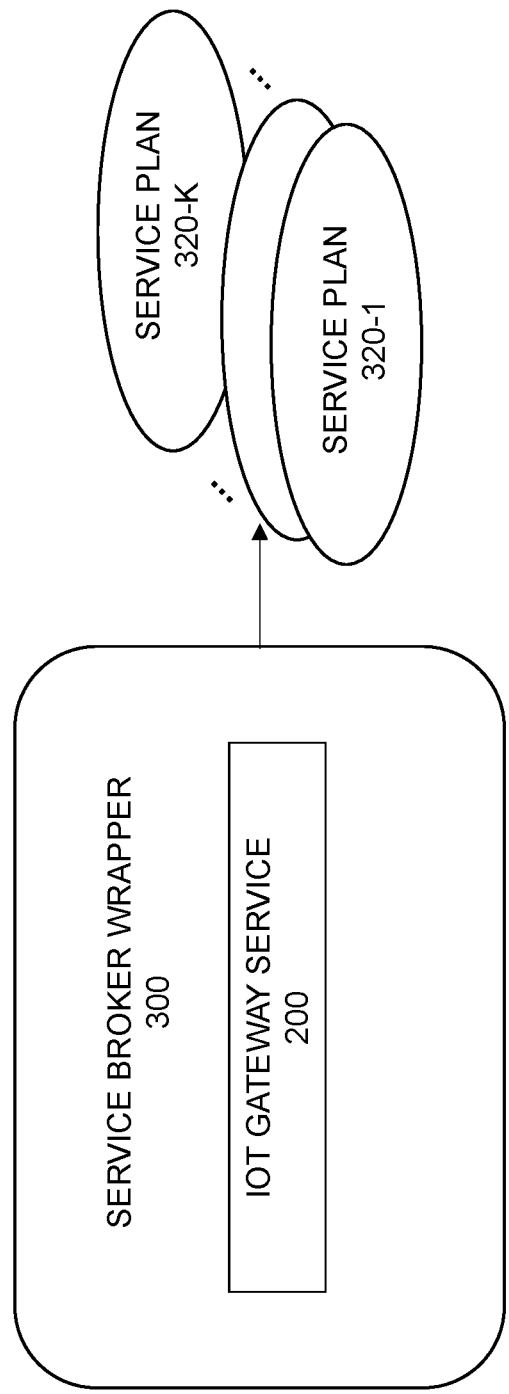

FIG. 3 illustrates an exemplary implementation of the IoT gateway service 200 of FIG. 2 in further detail, according to one or more embodiments. As noted above, the exemplary IoT gateway service 200 can optionally be wrapped with a service broker and exposed in the cloud foundry by the exemplary IoT gateway service tile 130-2 of FIG. 1.

As shown in FIG. 3, the exemplary IoT gateway service 200 is wrapped with a service broker wrapper 300, and the service broker wrapper 300 is provided to customers as part of one or more services plans 320-1 through 320-K, in a known manner (e.g., based on number of devices as a function of capacity).

Figure 4:
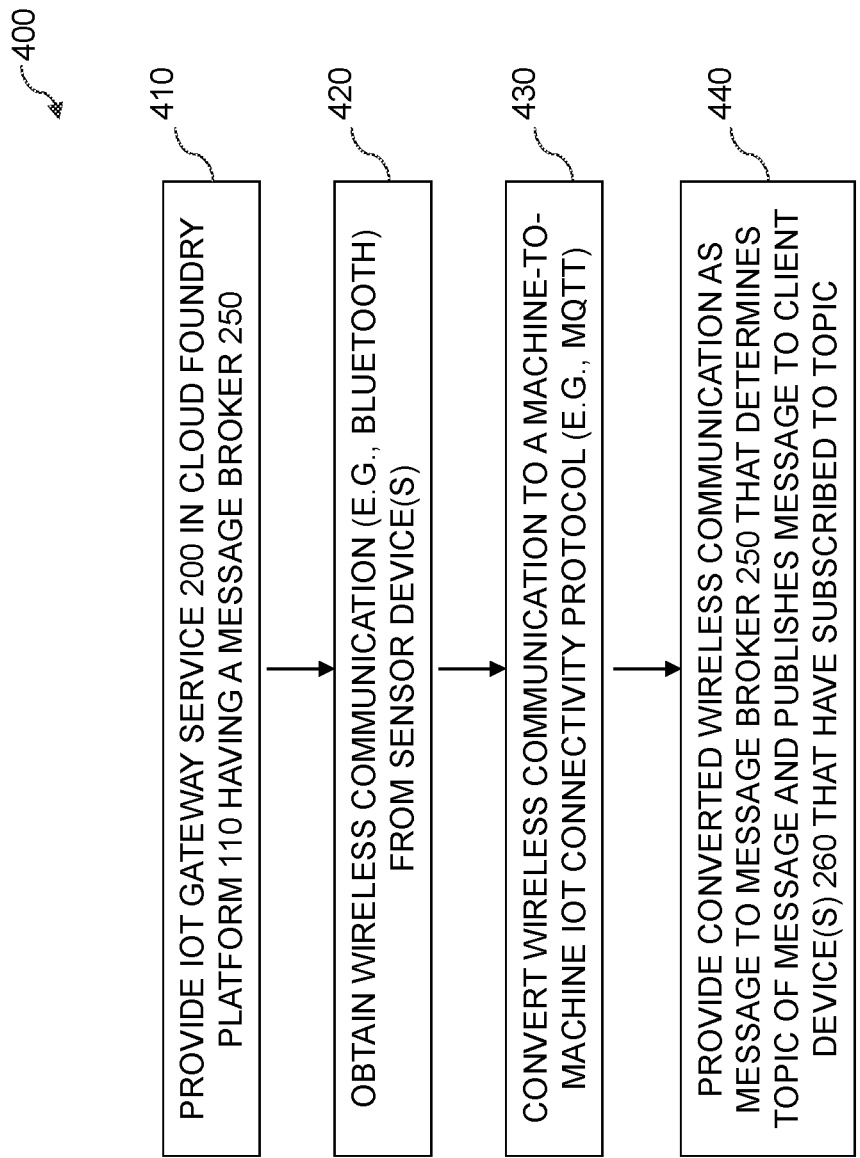
FIG. 4 is a flow chart illustrating an exemplary implementation of an IoT gateway service process, according to one embodiment of the disclosure.

FIG. 4 is a flow chart illustrating an exemplary implementation of an IoT gateway service process 400 for a cloud foundry, according to at least one embodiment. As shown in FIG. 4, the exemplary IoT gateway service process 400 initially provides an IoT gateway service 200 having a message broker 250 during step 410 in a cloud foundry platform 110. Thereafter, the IoT gateway service obtains a wireless communication, such as a BLE radio signal 220, from one or more sensor devices during step 420.

The wireless communication is converted during step 430 to a machine-to-machine IoT connectivity protocol (e.g., MQTT-SN). The converted wireless communication is provided as a message to the message broker 250 during step 440. The message broker 250 also determines a topic of the message during step 440 (optionally verifies the topic) and publishes the message to one or more client devices 260 that have subscribed to the topic.

Thus, in one or more embodiments, the disclosed techniques for providing an IoT gateway service on a cloud foundry platform employ open source technologies that allow one or more system components to be configurable and/or vendor neutral.

One or more embodiments of the disclosure provide improved methods, apparatus and computer program products for providing an IoT gateway service on a cloud foundry platform. The foregoing applications and associated embodiments should be considered as illustrative only, and numerous other embodiments can be configured using the techniques disclosed herein, in a wide variety of different applications.

It should also be understood that the disclosed IoT gateway service techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for providing an IoT gateway service on a cloud foundry may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based IoT gateway service engine 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based IoT gateway service platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
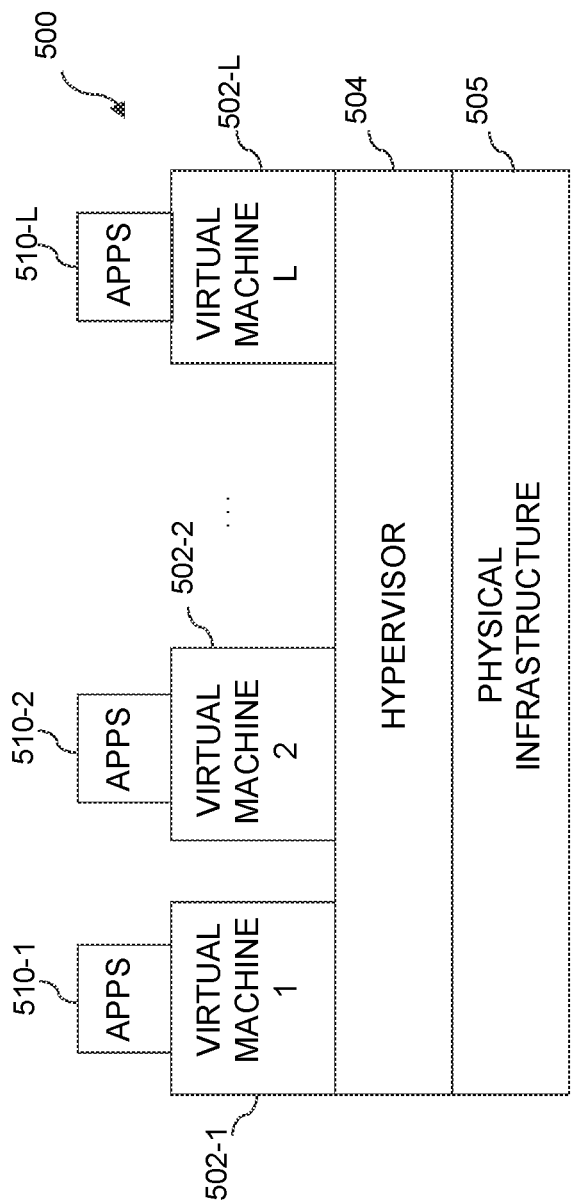
FIG. 5 illustrates an exemplary processing platform that may be used to implement at least a portion of one or more embodiments of the disclosure comprising a cloud infrastructure.

Referring now to FIG. 5, one possible processing platform that may be used to implement at least a portion of one or more embodiments of the disclosure comprises cloud infrastructure 500. The cloud infrastructure 500 in this exemplary processing platform comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

The cloud infrastructure 500 may encompass the entire given system or only portions of that given system, such as one or more of client, servers, controllers, or computing devices in the system.

Although only a single hypervisor 504 is shown in the embodiment of FIG. 5, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 504 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the cloud-based IoT gateway service engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed cloud-based IoT gateway service apparatus may each run on a computer, server, storage device or other processing platform element. A given such element may be viewed as an example of what is more generally referred to herein as a "processing device." The cloud infrastructure 500 shown in FIG. 5 may represent at least a portion of one processing platform.

Figure 6:
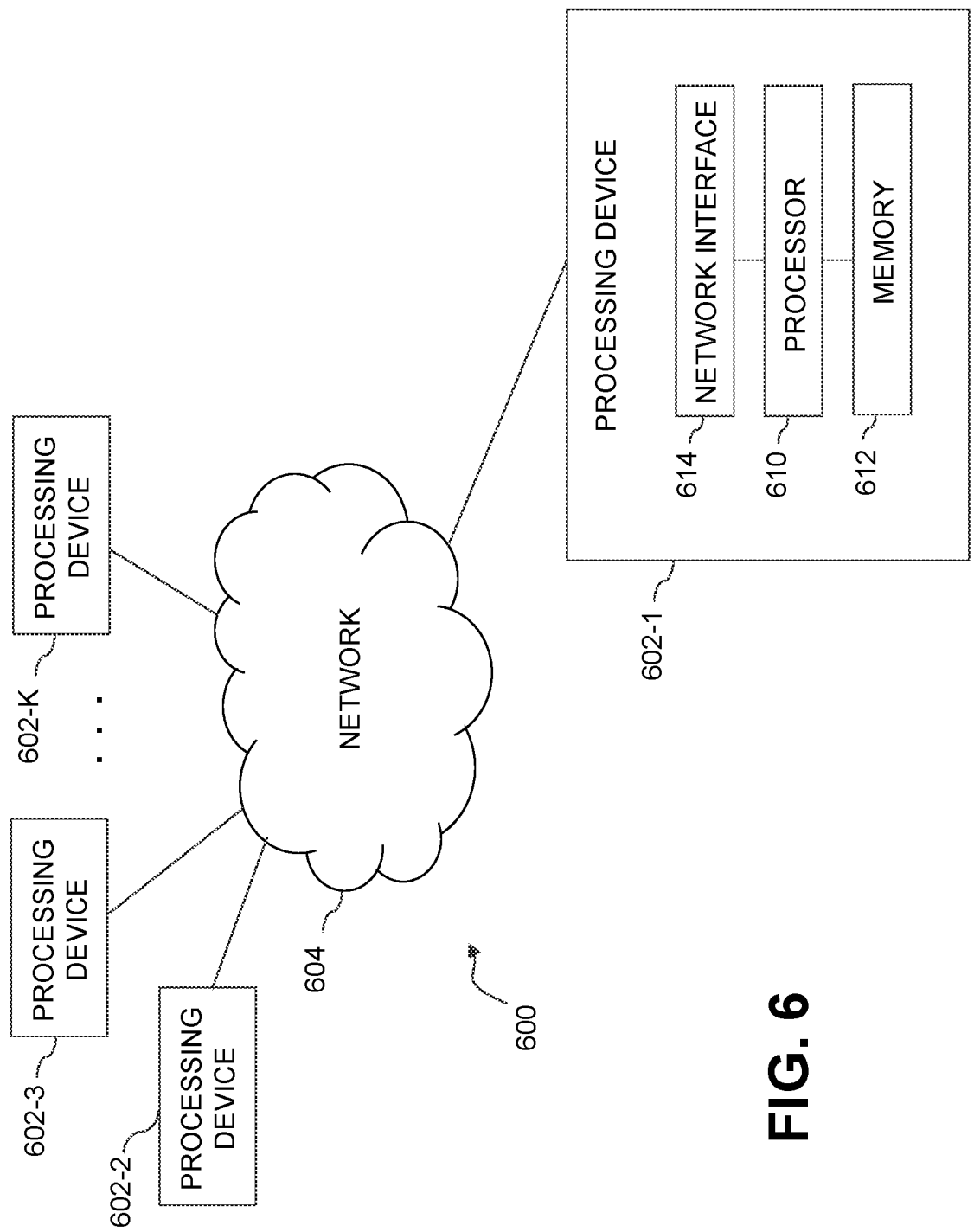
FIG. 6 illustrates another exemplary processing platform that may be used to implement at least a portion of one or more embodiments of the disclosure.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    providing an Internet of Things (IoT) gateway service in a cloud-based platform, wherein the IoT gateway service comprises (i) a bridge, (ii) a gateway of a machine-to-machine IoT connectivity protocol, and (iii) a message broker of said machine-to-machine IoT connectivity protocol, wherein said bridge comprises a Bluetooth Low Energy-to-Universal Asynchronous Receiver-Transmitter bridge;
    obtaining, by the bridge of the IoT gateway service, a wireless communication from one or more sensor devices, wherein the wireless communication comprises sensor data transmitted using a Bluetooth standard;
    converting, by the bridge of the IoT gateway service, the wireless communication comprising the sensor data transmitted using the Bluetooth standard to a message in said machine-to-machine IoT connectivity protocol;
    communicating, by the bridge of the IoT gateway service, said message to said gateway using a User Datagram Protocol; and
    providing, by the gateway of the machine-to-machine IoT connectivity protocol, the message to the message broker using a Transmission Control Protocol, wherein the message broker determines a topic of the message and publishes the message to one or more client devices that have subscribed to the topic using said Transmission Control Protocol.

2. The method of claim 1, wherein the machine-to-machine IoT connectivity protocol comprises a Message Queuing Telemetry Transport (MQTT) protocol.

3. The method of claim 1, wherein the message broker is implemented using open source technology.

4. The method of claim 3, wherein the open source implementation of the message broker publishes the message to the one or more client devices in a vendor neutral format.

5. The method of claim 1, wherein the message broker further verifies the topic of the message.

6. The method of claim 1, wherein the message broker and the one or more client devices employ a same open source technology.

7. The method of claim 1, further comprising a step of creating a service broker that wraps the IoT gateway service as a tile in the cloud-based platform.

8. The method of claim 1, wherein said cloud-based platform comprises a cloud foundry platform.

9. The method of claim 1, wherein said message broker comprises a Really Small Message Broker (RSMB).

10. A system, comprising:
    a memory; and
    at least one processing device, coupled to the memory, operative to implement the following steps:
    providing an Internet of Things (IoT) gateway service in a cloud-based platform, wherein the IoT gateway service comprises (i) a bridge, (ii) a gateway of a machine-to-machine IoT connectivity protocol, and (iii) a message broker of said machine-to-machine IoT connectivity protocol, wherein said bridge comprises a Bluetooth Low Energy-to-Universal Asynchronous Receiver-Transmitter bridge;
    obtaining, by the bridge of the IoT gateway service, a wireless communication from one or more sensor devices, wherein the wireless communication comprises sensor data transmitted using a Bluetooth standard;
    converting, by the bridge of the IoT gateway service, the wireless communication comprising the sensor data transmitted using the Bluetooth standard to a message in said machine-to-machine IoT connectivity protocol;
    communicating, by the bridge of the IoT gateway service, said message to said gateway using a User Datagram Protocol; and providing, by the gateway of the machine-to-machine IoT connectivity protocol, the message to the message broker using a Transmission Control Protocol, wherein the message broker determines a topic of the message and publishes the message to one or more client devices that have subscribed to the topic using said Transmission Control Protocol.

11. The system of claim 10, wherein the machine-to-machine IoT connectivity protocol comprises a Message Queuing Telemetry Transport (MQTT) protocol.

12. The system of claim 10, wherein the message broker is implemented using open source technology that allows the message broker to publish the message to the one or more client devices in a vendor neutral format.

13. The system of claim 10, wherein the message broker and the one or more client devices employ a same open source technology.

14. The system of claim 10, further comprising a step of creating a service broker that wraps the IoT gateway service as a tile in the cloud-based platform.

15. The system of claim 10, wherein the bridge of the IoT gateway service obtains the wireless communication directly from said one or more sensor devices.

16. A computer program product, comprising a non-transitory machine-readable storage medium having encoded therein executable code of one or more software programs, wherein the one or more software programs when executed by at least one processing device perform the following steps:
  providing an Internet of Things (IoT) gateway service in a cloud-based platform, wherein the IoT gateway service comprises (i) a bridge, (ii) a gateway of a machine-to-machine IoT connectivity protocol, and (iii) a message broker of said machine-to-machine IoT connectivity protocol, wherein said bridge comprises a Bluetooth Low Energy-to-Universal Asynchronous Receiver-Transmitter bridge;
  obtaining, by the bridge of the IoT gateway service, a wireless communication from one or more sensor devices, wherein the wireless communication comprises sensor data transmitted using a Bluetooth standard;
  converting, by the bridge of the IoT gateway service, the wireless communication comprising the sensor data transmitted using the Bluetooth standard to a message in said machine-to-machine IoT connectivity protocol;
  communicating, by the bridge of the IoT gateway service, said message to said gateway using a User Datagram Protocol; and
  providing, by the gateway of the machine-to-machine IoT connectivity protocol, the message to the message broker using a Transmission Control Protocol, wherein the message broker determines a topic of the message and publishes the message to one or more client devices that have subscribed to the topic using said Transmission Control Protocol.

17. The computer program product of claim 16, wherein the machine-to-machine IoT connectivity protocol comprises a Message Queuing Telemetry Transport (MQTT) protocol.

18. The computer program product of claim 16, wherein the message broker is implemented using open source technology that allows the message broker to publish the message to the one or more client devices in a vendor neutral format.

19. The computer program product of claim 16, wherein the message broker and the one or more client devices employ a same open source technology.

20. The computer program product of claim 16, further comprising a step of creating a service broker that wraps the IoT gateway service as a tile in the cloud-based platform.

\* \* \* \* \*